000
United States Patent [19]

Egami et al.

[11] Patent Number: 4,570,594
[45] Date of Patent: Feb. 18, 1986

[54] METHOD FOR CONTROLLING INTERNAL COMBUSTION ENGINE

[75] Inventors: Tsuneyuki Egami, Aichi; Hisasi Kawai, Toyohashi; Tsutomu Saito, Okazaki, all of Japan

[73] Assignee: Nippon Soken, Inc., Nishio, Japan

[21] Appl. No.: 676,286

[22] Filed: Nov. 29, 1984

[30] Foreign Application Priority Data

Dec. 1, 1983 [JP] Japan .................. 58-225406

[51] Int. Cl.[4] ............................. F02P 5/00
[52] U.S. Cl. .................... 123/414; 123/416; 123/417; 123/422; 123/423
[58] Field of Search ............ 123/414, 416, 417, 422, 123/423, 406, 418

[56] References Cited

U.S. PATENT DOCUMENTS

| | | | |
|---|---|---|---|
| 4,385,605 | 5/1983 | Petric et al. | 123/414 |
| 4,414,946 | 11/1983 | Daumer et al. | 123/414 |
| 4,499,875 | 2/1985 | Katayama et al. | 123/414 |
| 4,502,441 | 3/1985 | Katayama et al. | 123/414 |
| 4,515,131 | 5/1985 | Suzuki et al. | 123/414 |

Primary Examiner—Raymond A. Nelli
Attorney, Agent, or Firm—Cushman, Darby & Cushman

[57] ABSTRACT

In a method for controlling an internal combustion engine, a control signal is calculated according to a signal output from a rotational angle sensor in accordance with intervals of a predetermined crank angle $\theta_o$ within a range from a reference position to a position which does not exceed a retard angle $\theta$ and the deviation from the retard angle $\theta$ does not exceed the crank angle $\theta_o$. An angle deviation $\theta_s$ obtained as a remainder of a dividing operation is converted into a corresponding time period in accordance with a current average rotational speed of the engine. The time is counted in accordance with clock signals having a predetermined period. An internal combustion engine control signal is produced in accordance with this time counting operation. At least two instantaneous rotational speed data obtained for each angular signal from a rotational angle sensor are stored. The angle deviation $\theta_s$ is corrected in accordance with an instantaneous rotational speed at the timing at which an internal combustion engine control signal is produced in accordance with the stored data.

3 Claims, 17 Drawing Figures

METHOD FOR CONTROLLING INTERNAL COMBUSTION ENGINE

BACKGROUND OF THE INVENTION

1. Field of the Invention

The present invention relates to a method for controlling an internal combustion engine so as to perform ignition control or fuel control, wherein a signal is supplied to an external device at a desired rotational position of an internal combustion engine.

2. Description of the Related Art

Various electronic control apparatuses for an internal combustion engine are known. In one such apparatus a reference position sensor is used to produce a reference signal at a known rotational position of an internal combustion engine, a rotational angle sensor is used to produce angular signals at predetermined crank angle intervals of the internal combustion engine, and a control member is used such as a microcomputer having a time counting device. In this apparatus, only a limited number of angular signals are obtained from the rotational angle sensor per each revolution of the internal combustion engine. Therefore, each angular signal must be correctly interpolated to allow the production of correct outputs at desired rotational positions of the engine even when there are variations in the engine speed or the rotational speed of the engine, which are inherent in the internal combustion engine. However, when there are variations in the rotational speed of the internal combustion engine or when the engine is in a transient state such as acceleration or deceleration, this method cannot achieve a correct control, as explained in detail later.

SUMMARY OF THE INVENTION

It is an object of the present invention to provide an improved method for controlling an internal combustion engine, which can perform reliable and constant control even when variations in the rotational speed of the engine occur or the engine is in a transient state such as acceleration or deceleration.

Therefore, in accordance with the present invention, there is provided a method for controlling an internal combustion engine including a process for obtaining a retard angle ($\theta$) from the timing of an output of a reference angular position sensor to a desired rotational position by using a signal of a reference angular position sensor for producing a reference signal at a known rotational position of the engine, a signal of a rotational angle sensor for producing angular signals at predetermined crank angle intervals ($\theta_o$) of the engine, and timing signals produced at intervals of a predetermined time-length, for generating an engine control signal at a desired rotational position of the engine. The method comprises the steps of: obtaining the retard angle ($\theta$) by the signal from the rotational angle sensor, at a unit interval of the angle ($\theta_o$), from the reference angular position to an angular position which is nearest to but does not exceed the retard angle ($\theta$), the angular difference between the nearest angular position and the retard angle ($\theta$) not exceeding the predetermined crank angle ($\theta_o$); carrying out time-conversion of an angle deviation ($\theta_s$) as the remainder based on the current average engine rotational speed; counting the time obtained by the time-conversion by timing signals produced at intervals of a predetermined time-length; and producing an engine control signal based on the count value of the counting. At least two data of the instantaneous engine rotational speed obtained per angular signal of the rotational angular sensor are stored in a memory device, estimating instantaneous engine rotational speed at the timing at which the engine control signal is produced based on the data stored in the memory device, and the correction time-conversion of the angle deviation ($\theta_s$) is carried out based on the estimated instantaneous engine rotational speed.

DESCRIPTION OF THE PREFERRED EMBODIMENTS

Figure 1:
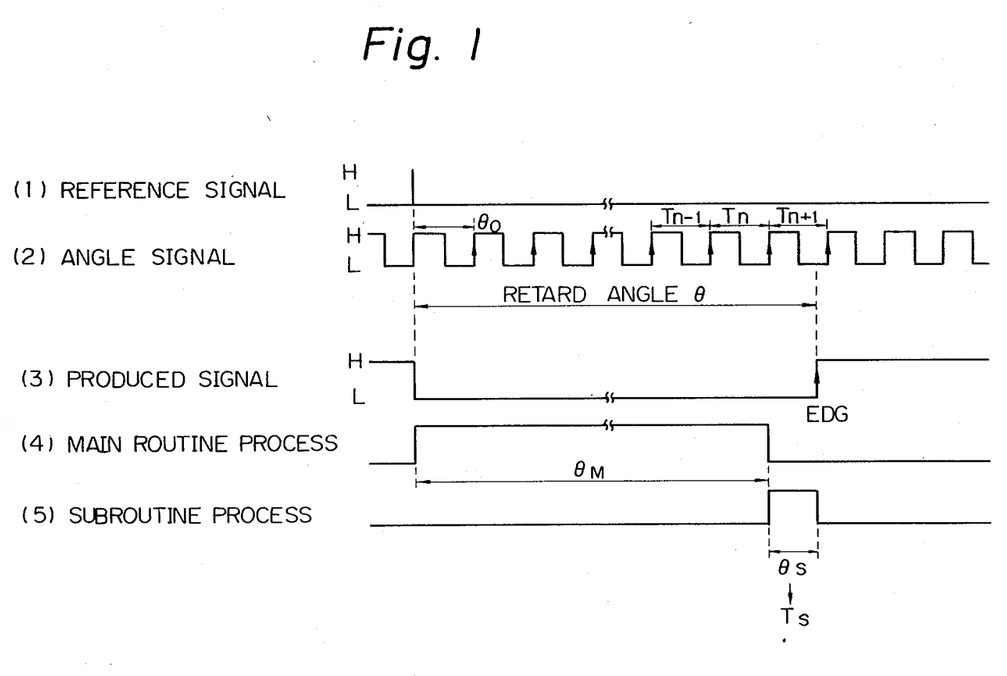
FIG. 1 shows the waveforms of various signals explaining a main routine and a subroutine for controlling an internal combustion engine.

To assist in a better understanding of the preferred embodiments of the present invention, a problem occurring during control of the timings for performing the main routine and subroutine processing in a prior art method for controlling an internal combustion engine will be described with reference to FIG. 1.

Conventionally, a retard angle $\theta$ from a reference signal is calculated from an angle $\theta_M$ of a main routine processing obtained by counting angular signals $\theta_o$, and an angle $\theta_s$ of a subroutine processing obtained by counting the duration of one angular signal in accordance with predetermined clock signals. This gives the following equations:

$$\theta = n \cdot \theta_o + \theta_s$$

(where n is an integer)

$$\theta_M = n \cdot \theta_o$$

$$T_S = T_n \cdot (\theta_s / \theta_o)$$

This subroutine angle is calculated by calculating an angle-time conversion coefficient $T_n/\theta_o$ from the relationship between a period $T_n$ of the angular signal immediately preceding the angle deviation $\theta_s$ and the angle $\theta_o$ of one angular signal, and by using the angle deviation as a time duration. This method allows reliable control when the periods $T_n$ and $T_{n+1}$ of the angular signals are equal to each other. However, when variations occur in the rotational speed of the internal combustion engine or when the engine is in a transient state such as acceleration or deceleration, this method cannot achieve a correct control. More specifically, when $T_n < T_{n+1}$, a leading edge EDG of the obtained signal has a lead angle, and when $T_n > T_{n+1}$, the leading edge EDG of the obtained signal has a retard angle. This is the problem to be solved by the preferred embodiments of the present invention.

Figure 2:
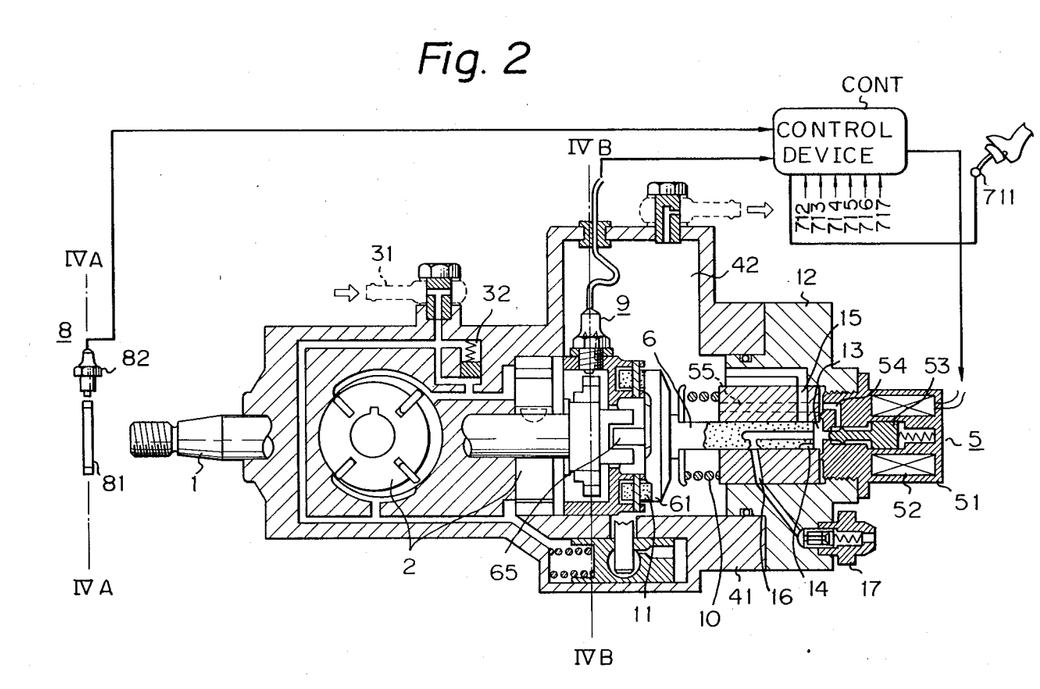
FIG. 2 is a sectional view of an apparatus for performing a method for controlling an internal combustion engine according to a first embodiment of the present invention.

FIG. 2 is a sectional view of an apparatus used in a method for controlling an internal combustion engine according to a first embodiment of the present invention. The apparatus shown in FIG. 2 is an injection quantity control system of a diesel engine for controlling a spill amount by a solenoid valve. FIGS. 3 to 6 explain the operation of the apparatus shown in FIG. 2.

Referring to FIG. 2, reference numeral 1 denotes a drive shaft driven by an internal combustion engine (not shown). Fuel is supplied through an intake port 31 to a vane pump 2 driven by the drive shaft 1 and is compressed by the pump 2. The pressure of the compressed fuel from the vane pump 2 is adjusted through a fuel pressure control valve 32 and is then supplied to a fuel chamber 42 formed inside a pump housing 41.

The drive shaft 1 drives a pressure plunger 6 through a coupling 65. The coupling 65 rotates the pressure plunger 6 in the radial direction but allows a free reciprocal movement of the plunger 6 in the axial direction. A face cam 61 is formed integrally with the pressure plunger 6. A spring 10 urges the face cam 61 against a cam roller 11. The cam roller 11 and the face cam 61 are of a known configuration wherein the rotational motion of the drive shaft 1 is converted into a reciprocal motion of the pressure plunger 6. When the cam roller 11 and the face cam 61 are in slidable contact, a projecting portion of the face cam 61 rides over the cam roller 11, causing the plunger 6 to reciprocate a number of times corresponding to the number of cylinders.

The pressure plunger 6 is fitted with a head 12 fixed to the housing 41 to constitute a pump chamber 13, and intake grooves 14 are formed in the pressure plunger 6. When one of the intake grooves 14 is communicated with an intake port 15 during the intake stroke of the plunger 6, fuel is supplied from the fuel chamber 42 to the pump chamber 13. The fuel in the pump chamber 13 is compressed during the compression stroke of the pressure plunger 6, and is then supplied to a fuel injection valve (not shown) of each cylinder through a pressure valve 17.

A fuel quantity adjustment mechanism 5 is connected to the pump chamber 13. When a current is supplied to a coil 52 of a solenoid valve 51, a needle valve 53 is lifted, and fuel under high pressure inside the pump chamber 13 is refluxed to the fuel chamber 42 through spill paths 54 and 55. When the solenoid valve 51 is operated during the compression stroke of the pressure plunger 6, fuel injection is terminated.

The timing of current supply to the solenoid valve 51 is controlled by an electronic control device CONT comprising a microcomputer or the like. The control device CONT receives signals representing the operating conditions of the internal combustion engine from various sensors of the internal combustion engine, i.e., signals from a rotational speed sensor 7, an accelerator sensor 711, or an engine temperature sensor (not shown), and a signal S(9) from a rotational angle sensor 9. In accordance with these input signals, the control device CONT controls the fuel quantity to be supplied to the engine by controlling current supply to the solenoid valve 51 by means of a logic function, to be described later.

Figure 3:
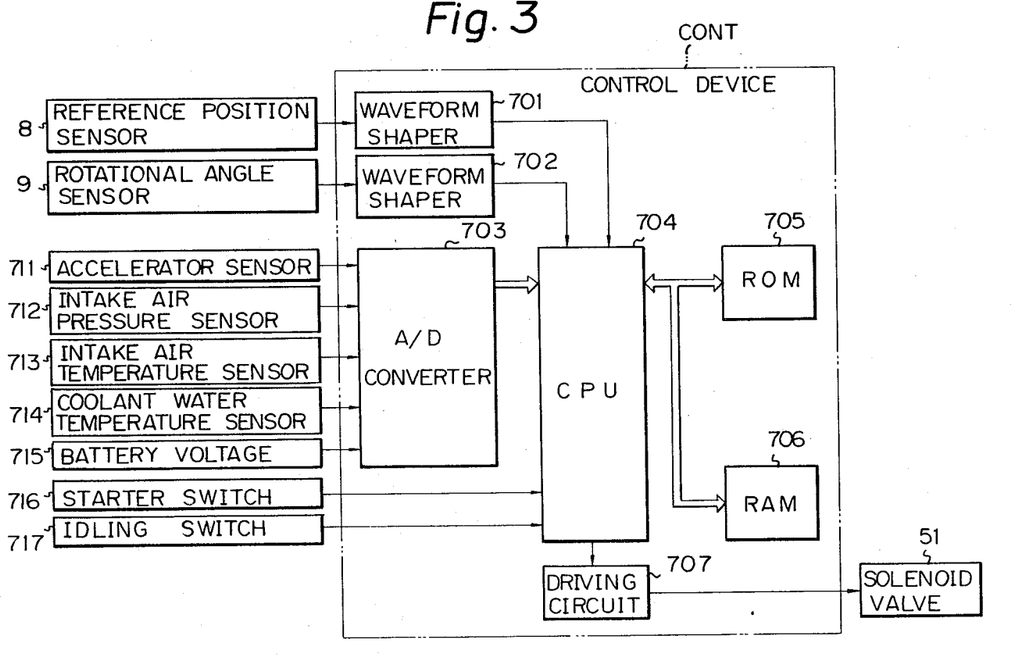
FIG. 3 is a block diagram showing the configuration of an electronic control device in the apparatus shown in FIG. 2.

FIG. 3 shows a block diagram of the electronic control device CONT. Referring to FIG. 3, the control device CONT comprises waveform shapers 701 and 702 for respectively shaping the signals from a reference position sensor 8 and the rotational angle sensor 9; an A/D converter 703 for converting into digital signals analog signals from the accelerator sensor 711, an intake pressure sensor 712, an intake temperature sensor 713, a coolant water temperature sensor 714, and a battery voltage 715; a CPU 704 for preparing signals for driving the solenoid valve 51 based on various input signals; a ROM 705 storing a program; a working RAM 706 for temporarily reading and writing data; and a driving circuit 107 for driving the solenoid valve 51 by amplifying an output signal from the CPU 704. Signals from a starter switch 716 and an idling switch 717 are also supplied to the CPU 704.

Figure 4A:
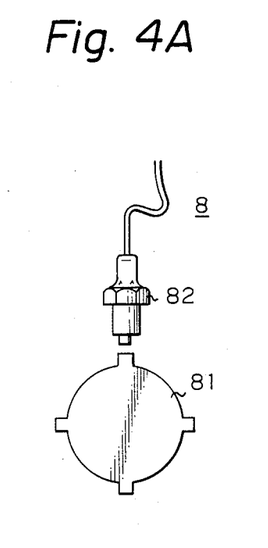
FIGS. 4A and 4B are sectional views along the lines IVA—IVA and IVB—IVB in FIG. 2.

The reference position sensor 8 is mounted on a camshaft of the engine (not shown) to rotate together with and in the same phase as the pump drive shaft 1. In a 4-cylinder internal combustion engine of the apparatus as shown in FIG. 2, the sensor 8 as shown in FIG. 4A comprises a disk 81 of a magnetic material and having four projections, and a proximity switch 82 such as a known pickup. The reference position sensor 8 functions as a rotational speed sensor for detecting an engine speed and as a reference position sensor for producing a reference position signal at a known rotational position of the engine.

Figure 4B:
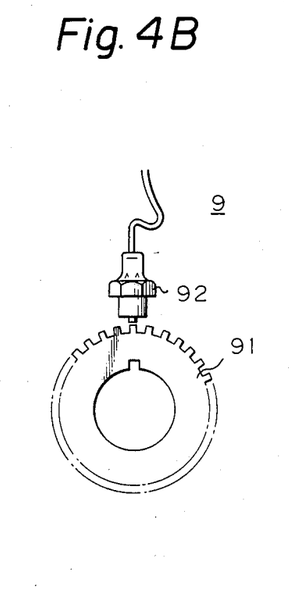

As shown in FIG. 4B a section along the line IVB—IVB in FIG. 2 shows that the rotational position sensor 9 comprises a disk 91 which is made of a magnetic material and having a plurality of projections and is mounted integrally on the pump drive shaft 1, and a proximity switch 92 similar to the proximity switch 82. The sensor 9 produces a signal for each predetermined rotational angle of the drive shaft 1 of the injection pump, i.e., for each predetermined crank angle. In the apparatus shown in FIG. 2, the disk 91 has 32 projections. Thus, at each one revolution of the pump drive shaft 1, i.e., at every two revolutions of the crankshaft of the engine, the sensor 9 produces 32 signals. Accordingly, the sensor 9 produces a signal per each crank angle of 22.5°.

The accelerator sensor 9 comprises, for example, a known potentiometer and supplies required engine load information to the electronic control device CONT.

Figure 5:
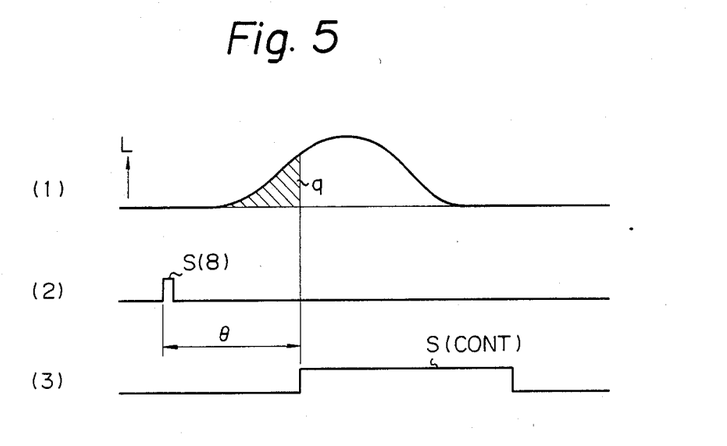
FIGS. 5 and 6 are timing charts showing signal waveforms explaining the basic principle of controlling an injection quantity to allow easy understanding of the present invention.
Figure 6:
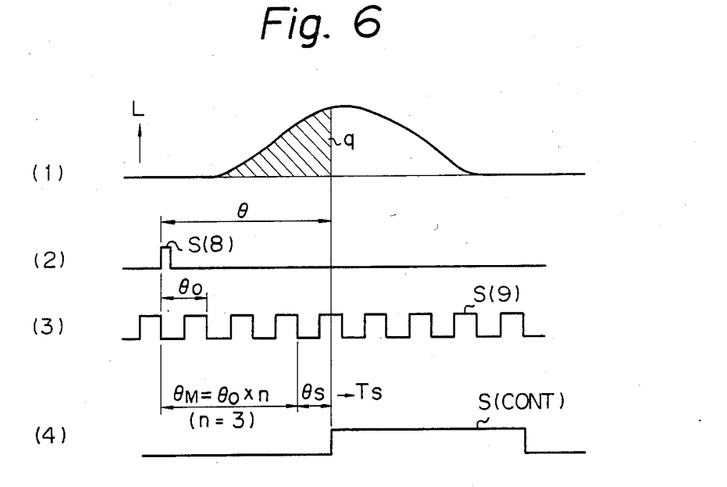

The mode of operation of the apparatus shown in FIG. 2 will be described with reference to FIGS. 5 and 6. FIG. 5 is a timing chart showing the basic principle of the fuel quantity control made by the apparatus shown in FIG. 2. FIG. 5(1) shows a lift L of the plunger 6 of the injection pump, FIG. 5(2) shows a reference signal S(8) from the reference position sensor 8 produced at a known rotational position of the internal combustion engine, and FIG. 5(3) shows an ON pulse signal S(CONT) supplied to the spill amount control solenoid valve 51. In accordance with the additional information supplied from the reference position sensor 8, the accelerator sensor 711, the pressure and temperature sensors (not shown), and the like, the electronic control device CONT determines a fuel quantity q required by the engine and calculates the spill start timing corresponding to this fuel quantity q as a retard angle $\theta°$ CA from the reference signal. The control device CONT starts the current supply to the solenoid valve 51 at the calculated timing to terminate the fuel injection.

During the intake stroke of the plunger 6, the solenoid valve 51 must be closed to allow the next injection stroke. However, the closing timing of the valve 51 can be any timing occurring during the intake stroke and need not be controlled with high precision. In contrast to this, the opening timing of the valve 51 is an important parameter directly determining the injection quantity and must be controlled with an extremely high precision. The basic principle of the apparatus shown in FIG. 2 is based on the following assumption. That is, high-precision control of the valve 51 can be easily performed by using the rotational angle signal S(9) having an infinitely high resolution, although with the currently available techniques, a finite number of angular signals produced from the rotational angle sensor per revolution of the engine and a time counting device incorporated in a control microcomputer must both be used.

The control method in the apparatus shown in FIG. 2 will be described with reference to FIGS. 6 and 7. FIG. 6(1) shows a lift of the plunger L, FIG. 6(2) shows a reference signal, FIG. 6(3) shows a rotational angle sensor signal, and FIG. 6(4) shows an ON pulse for the solenoid valve 51. The pulse shown in FIG. 6(4) is an angular signal S(9) obtained by shaping an output signal from the rotational angle sensor 9.

In the apparatus shown in FIG. 2, 32 signals are produced per each two revolutions of the engine. Therefore, one cycle of the angular signals corresponds to 22.5° CA. The electronic control device CONT calculates a quotient n (where n is an integer) and a remainder $\theta_s$ obtained by dividing the retard angle $\theta$ of the solenoid valve 21 by $\theta_o$ in accordance with the required fuel quantity q.

An interval corresponding to $\theta_o \times n = \theta_M$ can be correctly determined by an angular signal S(50). Therefore, deviation angle $\theta_s$ is smaller than one angular signal cycle $\theta_o$ as a minimum resolution of the angle signals and therefore cannot be treated as an angle. Accordingly, this angle is converted into an angle deviation time $T_S$ corresponding thereto in accordance with the instantaneous rotational speed. Thus, a command for opening the valve 51 is produced and the spill operation is started, after n angular signals S(9) are produced from the rotational angle sensor 9, from the reference position at which the reference signal (FIG. 6(2)) is produced and thereafter the angle deviation time $T_S$ has elapsed.

Figure 7:
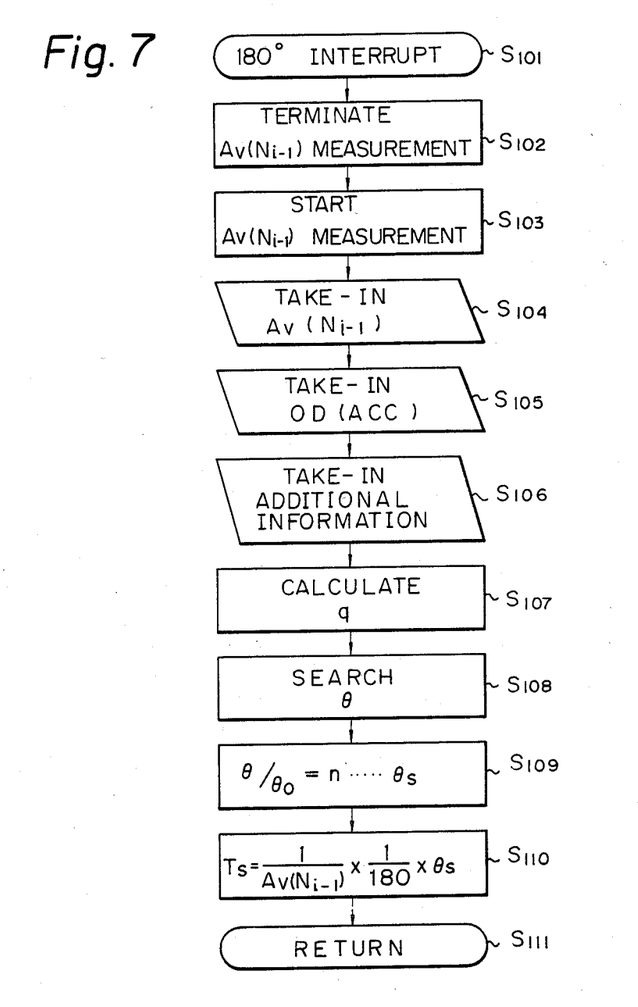
FIG. 7 is a flowchart showing the control sequence shown in FIG. 6.

FIG. 7 is a flowchart showing the processing in the electronic control device CONT for executing the above-mentioned control operation. The above-mentioned control processing is performed by an interrupt every time a reference signal is received from the reference position sensor 8, i.e., at every 180° CA of the engine rotational angle. In step S101, an interrupt routine is started. In step S102, the rotational speed measurement performed in the preceding 180° interrupt routine is terminated. In step S103, the current rotational speed measurement is started. The rotational speed is calculated as an average rotational speed of the engine during the 180° interval. In the case of a 4-cylinder internal combustion engine of this embodiment, the period of the cyclic rotation variations accompanying the compression/power strokes is 180° CA. Therefore, a correct average rotational speed can be obtained.

In steps S104 to S106, additional data such as the average rotational speed $Av(N_{i-1})$, the accelerator opening OD (ACC), and coolant water temperature of the engine are taken in or fetched. Based on the data fetched in this manner, an injection quantity q of the engine is calculated in step S107.

In step S108, a retard angle $\theta$ of the spill solenoid valve 51 corresponding to the injection quantity q is searched or retrieved from a map stored in a memory. As described above, the quotient n and the remainder $\theta_s$ are obtained by dividing the angle $\theta$ by one angular signal cycle $\theta_o$ in step S109. In step S110, the time $T_S$ corresponding to the angle deviation $\theta_s°$ CA is calculated in accordance with the average rotational speed $Av(N_{i-1})$ fetched in step S104.

Thus the interrupt operation for each 180° CA is ended, and the values of n and $T_S$ obtained in the above processing are set in the electronic control device CONT. The spill solenoid valve 51 is opened after the angle corresponding to n angular signals and the time $T_S$ from the known reference signal of the engine is obtained from the reference position sensor 8.

The problem encountered with the solenoid valve spill amount adjustment system described above will be described below with reference to FIG. 8. If the rotation of an engine is smooth, i.e., no rotational variations occur, and if the average rotational speed Av(N) is constantly maintained, no problem is encountered. However, in practice, rotation variations accompanying combustion inherent to a reciprocating engine are involved. The solid line in FIG. 8(2) shows the sampled rotational speed per angular signal. Fuel injection is performed in the engine stroke immediately before the top dead center in the compression stroke and the engine speed is minimum in a phase corresponding to the angle deviation $\theta_s$.

Therefore, a large engine speed deviation $\epsilon$ is present between an instantaneous rotational speed $N_X$ at the position corresponding to the angle deviation $\theta_s$, and the average rotational speed Av(N). However, when the control operation is performed according to the sequence shown in FIG. 6, the deviation $\epsilon$ is neglected. Therefore, the rotational angle corresponding to the time $T_S$ becomes shorter than the true value $\theta_s$ of the angle deviation. The spill operation timing then becomes too early, and the injection quantity becomes too small. Although no rotation variation occurs during the normal operation of the engine, the engine is more frequently operated in a transient state.

Figure 8:
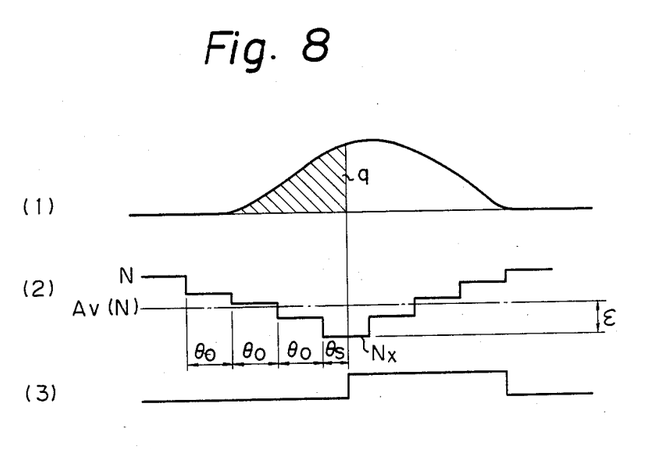
FIGS. 8 to 11 are timing charts showing waveforms explaining the control method shown in FIG. 6.
Figure 9:
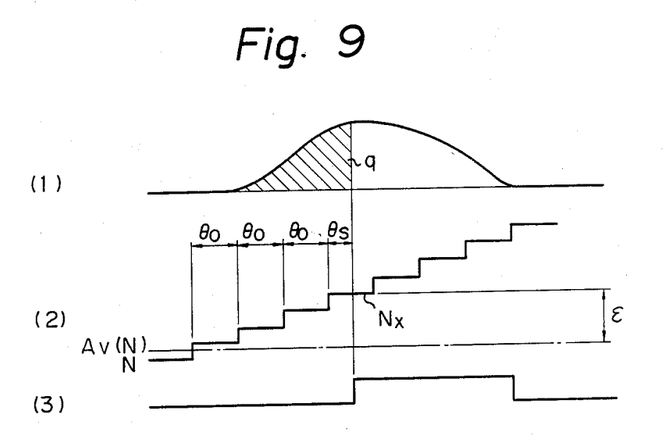
Figure 10:
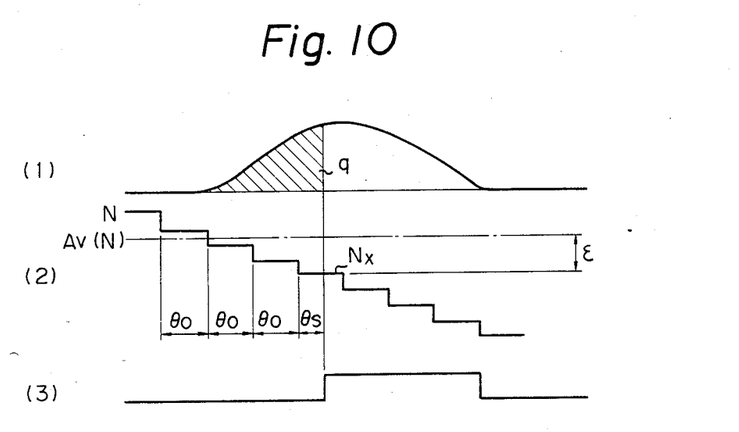

FIGS. 9 and 10 show the rotational speeds in the acceleration and deceleration states of the engine, in the same manner as shown in FIG. 8. Referring to FIG. 9, since the engine is accelerating, an instantaneous rotational speed N is increasing. Therefore, the instantaneous rotational speed $N_X$ at the engine rotational angular position corresponding to the angle deviation $\theta_s$ becomes higher than the average rotational speed Av(N), thus producing the deviation $\epsilon$.

Referring to FIG. 10, since the engine is decelerating, the instantaneous rotational speed $N_X$ is lower than the average rotational speed Av(N), thus also producing the deviation $\epsilon$. However, when the control operation is performed in accordance with the sequence shown in FIG. 7, the deviation $\epsilon$ is neglected as described above. The rotational angular position corresponding to the time $T_S$ in the acceleration mode becomes larger than the true angle deviation $\theta_s$. The spill operation is delayed, and the injection quantity is increased. However, when the engine is decelerating, the injection quantity becomes smaller than the required quantity.

Figure 11:
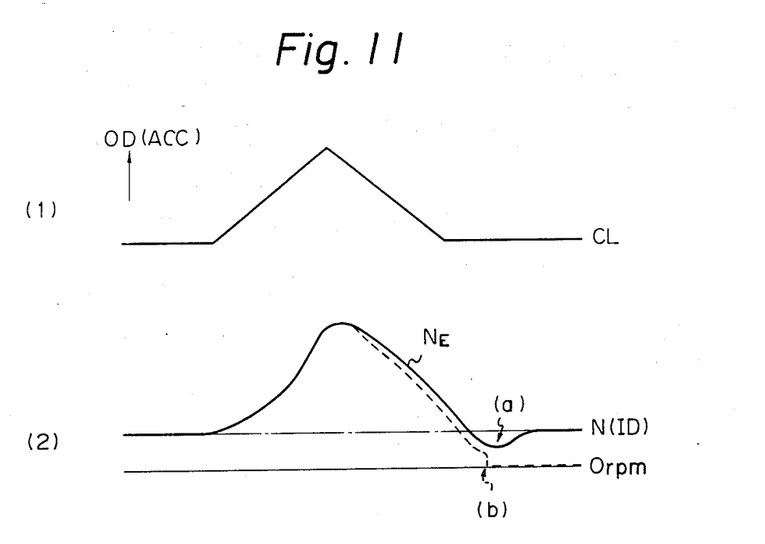

This problem is notable in a racing mode wherein an engine load is high, as will be described with reference to FIG. 11. FIG. 11(1) shows an accelerator opening OD(ACC) in the racing mode, and CL denotes the fully closed state of the accelerator opening. The solid and dotted lines in FIG. 10(2) show a rotational speed $N_E$ of the engine. At the end of the deceleration operation, where an idling rotational speed N(ID) is obtained, the rotational speed becomes lower than the idling rotational speed as indicated by the solid line (a). In some cases, as indicated by the dotted line (b), the engine may be stopped completely. This results in a very poor operation of the vehicle. The apparatus of FIG. 2, according to the present invention, is devised to solve this problem.

Figure 12:
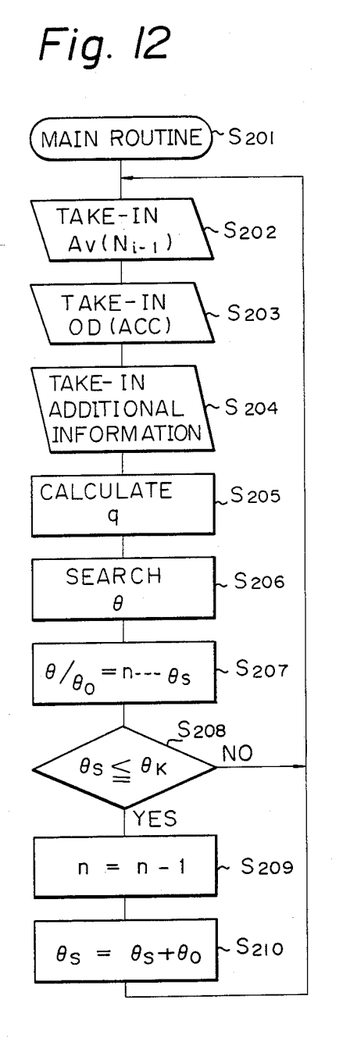
FIGS. 12 to 15 are flowcharts explaining the operation of the apparatus shown in FIG. 2.

The processing performed by the electronic control device CONT will be described with reference to FIGS. 12 to 15. FIG. 12 shows a flowchart of a main routine started after the microcomputer is reset. This main routine is started in step S201. In step S202, the average rotational speed $Av(N_{i-1})$ is taken in. In steps S203 and S204, additional data such as the accelerator opening OD(ACC) and the coolant water temperature of the engine are taken in. An injection quantity q of the engine is calculated in step S205 in accordance with the information taken in steps S202 to S204.

In step S206, a retard angle $\theta$ of the solenoid valve is searched for from a map stored in a memory. In step S207, a quotient n and a remainder $\theta_s$ are obtained by dividing $\theta$ by one cycle $\theta_o$ of the rotational angle sensor signal S(50). In step S208, the angle deviation $\theta_s$ is compared with a preset value $\theta_k$. If $\theta_s > \theta_k$, the flow returns to step S202 and the above processing is repeated. If it is determined in step S208 that $\theta_s \leq \theta_k$, the quotient n is decremented by one, $\theta_o$ is added to the angle deviation $\theta_s$, and the flow returns to step S202. The object of the processing in steps S208 to S210 will be described later.

Figure 13:
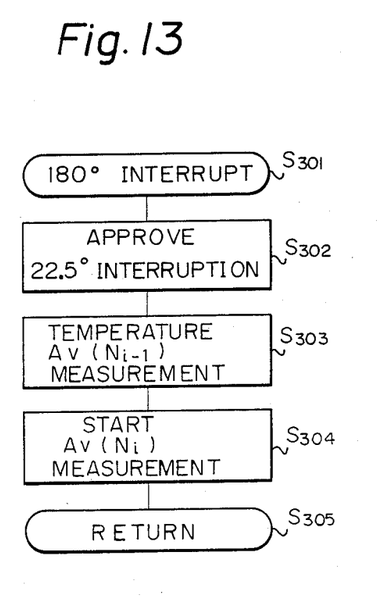

FIG. 13 is a flowchart of a 180° CA interrupt routine performed every time a reference signal is received. In step S301, processing is started. In step S302, the 22.5° CA interrupt routine performed upon reception of an angular signal to be described later is approved. In step S303, calculation of the average rotational speed $Av(N_{i-1})$ in the period from the immediately preceding interruption to the current interruption is terminated. In step S304, the next average rotational speed $Av(N_i)$ is calculated. The average rotational speed $Av(N_{i-1})$ obtained in this routine is taken in the main routine shown in FIG. 12.

Figure 14:
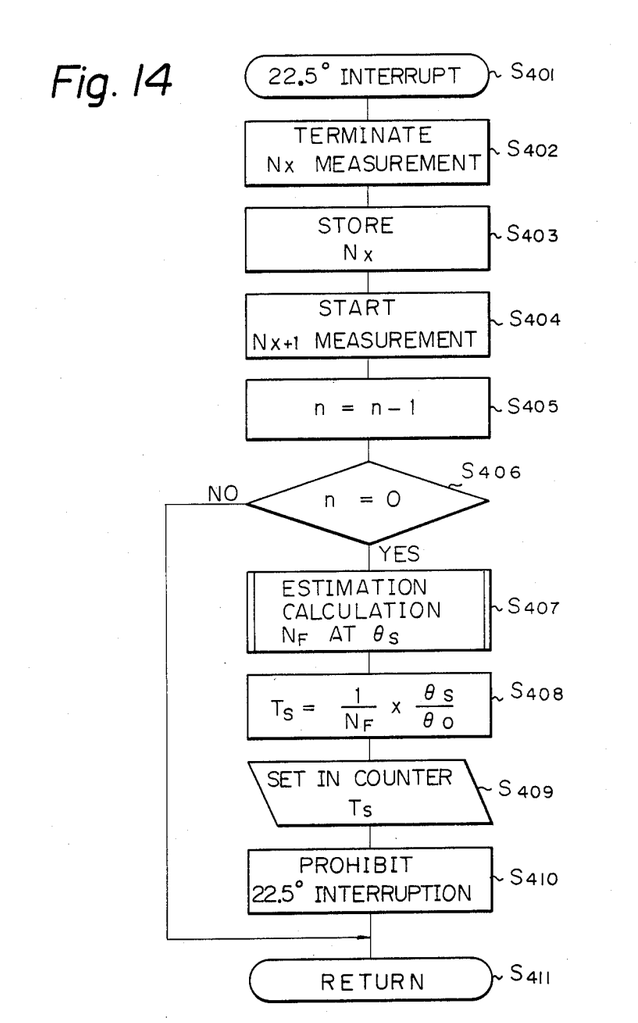

FIG. 14 is a flowchart of the 22.5° CA interrupt routine performed upon reception of each angular signal. Since the main routine is approved in the 180° CA interrupt routine described above, the main routine is started from step S401. In step S402, the measurement of the instantaneous rotational speed $N_X$ is terminated, and the obtained speed $N_X$ is stored in a memory. The memory has a memory area of at least two words, to allow storage of at least two preceding instantaneous rotational speeds.

In step S404, measurement of the next instantaneous rotational speed $N_{X+1}$ is started. In step S405, the quotient n obtained in the main routine is decremented by one. This quotient is decremented in unitary decrements every time the 22.5° CA interrupt routine is performed.

In step S406, it is checked if the quotient n has become 0. If NO, the routine is ended. However, when the quotient n is 0, the timing for performing this routine corresponds to the timing at which the valve opening timing is calculated by converting the angular deviation $\theta_s$ into the time $T_S$. Therefore, in step S407, an estimated value $N_F$ of the instantaneous rotational speed corresponding to the angle deviation $\theta_s$ is calculated in accordance with the preceding instantaneous rotational speed stored in step S403.

In step S408, the time $T_S$ corresponding to the angle deviation $\theta_s$ is calculated using the estimated value $N_F$ of the instantaneous rotational speed. In step S409, the spill solenoid valve is opened after n angular signals are produced and the time $T_S$ has elapsed from the timing of the reference signal.

In step S410, the 22.5° CA interrupt routine is prohibited, and the processing of the main routine is not performed until it is approved in the 180° CA interrupt routine.

Figure 15:
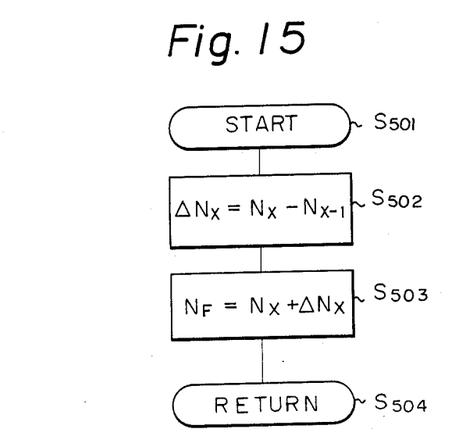

The estimated value calculation in step S407 in FIG. 17 will be described with reference to FIG. 15. In a routine called in the 22.5° CA interrupt routine, processing is started in step S501. In step S502, a difference $\Delta N_X$ between the instantaneous rotational speed $N_X$ (the measurement of which is terminated in the 22.5° CA interrupt routine) and the preceding instantaneous rotational speed $N_{X-1}$ is calculated.

The difference $\Delta N_X$ is a change between instantaneous rotational speeds corresponding to continuous angular signals and can be considered as a difference between the estimated value $N_F$ of the instantaneous rotational speed calculated in the next 22.5° CA interrupt routine and the current instantaneous rotational speed $N_X$. Therefore, the estimated value $N_F$ of the instantaneous rotational speed calculated in the next 22.5° CA interrupt routine is calculated in step S503.

The present invention is not limited to the embodiments described above, and various changes and modifications may be made. For example, in the embodiment shown in FIG. 14, a coefficient is not attached to the term $\Delta N_X$ in step S503. However, in order to allow more reliable estimation, a predetermined weighting coefficient may be used such that $N_F = N_X + K \cdot \Delta N_X$.

Figure 16:
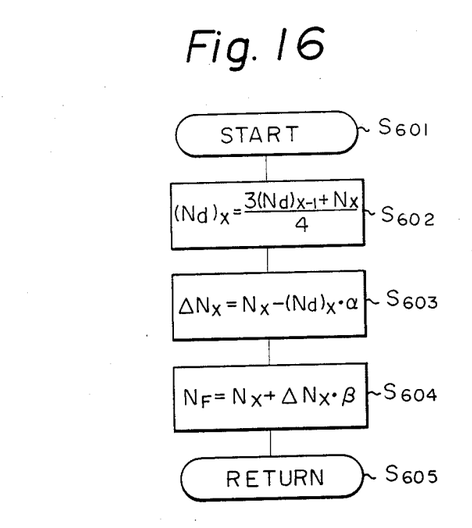
FIG. 16 is a flowchart showing another embodiment of the present invention.

Another method of calculating the estimated value $N_F$ of the instantaneous rotational speed will be described briefly with reference to the flowchart shown in FIG. 16. In step S601, the processing is started. In step S602, a blunted rotational speed $(N_d)_{X-1}$ and the current rotational speed are added with a weighting coefficient ratio of 3:1, to calculate the blunted rotational speed $(N_d)_X$ in the current 22.5° CA interrupt routine. In step S603, the current blunted rotational speed $(N_d)_X$ multiplied by a coefficient $\alpha$ is subtracted from the current instantaneous rotational speed $N_X$. In step S604, the current instantaneous rotational speed $N_X$ is added to the change $\Delta N_X$ in the instantaneous rotational speed multiplied with a coefficient $\beta$ to calculate the estimated value $N_F$ of the instantaneous rotational speed.

In the embodiment described above, the present invention is applied to an engine control system for controlling the spill amount using a solenoid valve. However, the present invention is not limited to this purpose. In that the present invention can be similarly applied to a system wherein an ignition timing of a gasoline engine is electronically controlled in accordance with a reference signal and a rotational angular signal.

We claim:

1. A method for controlling an internal combustion engine including a process for obtaining a retard angle ($\theta$) from the timing of an output of a reference angular position sensor to a desired rotational position by using a signal of a reference angular position sensor for producing a reference signal at a known rotational position of the engine, a signal of a rotational angle sensor for producing angular signals with intervals of a predetermined crank angle ($\theta_o$) of the engine, and timing signals produced with intervals of a predetermined time-length, for generating an engine control signal at a desired rotational position of the engine;

said method comprising the steps of:

obtaining the retard angle ($\theta$) by the signal of said rotational angle sensor, with unit intervals of the angle ($\theta_o$), from the reference angular position to an angular position which is nearest to but does not exceed said retard angle ($\theta$), the angular difference between said nearest angular position and said retard angle ($\theta$) not exceeding said predetermined crank angle ($\theta_o$);

carrying out the time-conversion of an angle deviation ($\theta_s$) as the remainder based on current average engine rotational speed;

counting the time obtained by said time-conversion by said timing signals produced with intervals of a predetermined time-length; and producing engine control signal based on the count value of said counting;

wherein at least two data of instantaneous engine rotational speed obtained per angular signal of said rotational angular sensor are stored in a memory device;

estimating instantaneous engine rotational speed at the timing at which the engine control signal is produced based on said data stored in the memory device; and the correction time-conversion of said angle deviation ($\theta_s$) is carried out based on said estimated instantaneous engine rotational speed.

2. A method according to claim 1, wherein said estimation of instantaneous engine rotational speed is carried out using the difference between the instantaneous engine rotational speed obtained from the period of the angular signal at one step preceding said angle deviation ($\theta_s$) and the instantaneous engine rotational speed obtained from the period of the angular signal at two steps preceding said angle deviation ($\theta_s$).

3. A method according to claim 1, wherein said estimation of instantaneous engine rotational speed is carried out based on the relationship between the blunted rotational speed obtained from periods of angular signal preceding said angle deviation ($\theta_s$) and the instantaneous engine rotational speed obtained from the period of the angular signal at one step preceding said angle deviation ($\theta_s$).

* * * * *